(12) United States Patent
McQuinn

(10) Patent No.: US 6,198,986 B1
(45) Date of Patent: Mar. 6, 2001

(54) PRE-CHARGED MULTI-VARIABLE RATE CROP INPUT APPLICATOR MACHINE

(75) Inventor: Alvin E. McQuinn, Edina, MN (US)

(73) Assignee: Ag-Chem Equipment Co., Inc., Minnetonka, MN (US)

(*) Notice: Subject to any disclaimer, the term of this patent is extended or adjusted under 35 U.S.C. 154(b) by 0 days.

(21) Appl. No.: 09/303,194

(22) Filed: Apr. 30, 1999

(51) Int. Cl.⁷ .................................................. G06F 17/00
(52) U.S. Cl. ........................ 700/242; 700/241; 700/244; 111/903
(58) Field of Search ..................................... 700/240, 233, 700/241, 242, 244, 276; 111/903, 200

(56) References Cited

U.S. PATENT DOCUMENTS

| | | | |
|---|---|---|---|
| Re. 35,100 | 11/1995 | Monson et al. | 111/130 |
| 3,511,411 * | 5/1970 | Weiss | 222/52 |
| 3,921,159 * | 11/1975 | Steffen | 340/671 |
| 4,630,773 | 12/1986 | Ortlip | 239/1 |
| 5,050,771 * | 9/1991 | Hanson et al. | 222/1 |
| 5,140,917 * | 8/1992 | Swanson | 111/187 |
| 5,220,876 * | 6/1993 | Monson et al. | 111/130 |
| 5,260,875 * | 11/1993 | Tofte et al. | 701/50 |
| 5,355,815 | 10/1994 | Monson | 111/200 |
| 5,453,924 | 9/1995 | Monson et al. | 364/131 |
| 5,574,657 * | 11/1996 | Tofte et al. | 364/510 |
| 5,621,666 * | 4/1997 | O'Neall et al. | 364/555 |
| 5,646,846 * | 7/1997 | Bruce et al. | 701/50 |
| 5,673,637 * | 10/1997 | Colburn, Jr. et al. | 111/118 |
| 5,689,418 | 11/1997 | Monson | 364/420 |
| 5,751,576 | 5/1998 | Monson | 364/188 |
| 5,757,640 * | 5/1998 | Monson | 364/131 |
| 5,870,686 | 2/1999 | Monson | 701/1 |
| 5,887,491 | 3/1999 | Monson et al. | 74/864.74 |
| 5,913,915 * | 6/1999 | McQuinn | 701/50 |
| 5,915,313 * | 6/1999 | Bender et al. | 111/178 |
| 5,919,242 * | 7/1999 | Greatline et al. | 701/50 |
| 5,924,371 * | 7/1999 | Flamme et al. | 111/177 |
| 5,931,882 * | 8/1999 | Fick et al. | 701/50 |
| 5,956,255 * | 9/1999 | Flamme | 111/903 |
| 5,979,703 * | 11/1999 | Nystrom | 222/58 |
| 5,995,895 * | 11/1999 | Watt et al. | 701/50 |
| 6,003,455 * | 12/1999 | Flamme et al. | 111/200 |
| 6,009,354 | 12/1999 | Flamme et al. | 700/184 |
| 6,024,035 * | 2/2000 | Flamme | 111/178 |
| 6,070,539 * | 6/2000 | Flamme et al. | 111/177 |

* cited by examiner

*Primary Examiner*—Christopher P. Ellis
*Assistant Examiner*—Khoi H. Tran
(74) *Attorney, Agent, or Firm*—Kinney & Lange, P.A.

(57) ABSTRACT

A pre-charged multi-variable rate crop input applicator implement comprising a plurality of crop input storage reservoirs located on the implement. The reservoirs on the implement are charged with crop inputs from a remote source. The crop inputs are released from the reservoirs on the implement to the field. Since the reservoirs are pre-charged with crop inputs, the time it takes for a crop input to reach the ground is negligible, making the implement particularly suited to precision farming applications. An accompanying control system controls the rate of discharge of crop inputs at each dispensing point on the implement allowing multiple crop inputs to be applied at a variable rate and at the desired prescriptive mix.

12 Claims, 3 Drawing Sheets

PRE-CHARGED MULTI-VARIABLE RATE CROP INPUT APPLICATOR MACHINE

CROSS-REFERENCE TO RELATED APPLICATION(S)

None.

BACKGROUND OF THE INVENTION

This invention relates to crop input application implements used in site specific farming. More particularly, this invention relates to a crop input applicator capable of applying multiple crop inputs. The applicator has crop input reservoirs that are pre-charged with crop inputs from a remote source. Because the reservoirs on the implement are pre-charged, crop inputs are moved much closer to the dispensing point on the implement, and the time from when a crop input is released from the reservoirs until it reaches the ground is almost negligible. Furthermore, there is no need to stop the applicator to refill the crop input reservoirs and because the reservoirs hold multiple crop inputs, the applicator can apply multiple crop inputs at a desired prescriptive rate.

To compete in the global economy, farmers have been forced to become as cost effective as possible. In doing so, farmers have increasingly turned to high technology in the form of precision farming. Precision farming uses a locating system, such as a global positioning system (GPS), and site specific data. In addition, modern tractor vehicles are equipped with an onboard computer and a GPS receiver to locate the vehicle's position in the field. The computer uses the site specific data and information from the global positioning system to apply crop inputs in precise amounts at the precise desired location.

To improve efficiency, farmers have started using larger implements in an attempt to cover more ground in one pass. Likewise, more than one implement may be towed so that more than one product can be applied in one pass through the field. Often, a tractor vehicle tows a different crop input storage tank or container for each type of crop input applied. In these "mule train" type set ups, there may be a significant delay in time from when the crop input is dispensed from any storage tank to when it reaches the agricultural field. Such delays can defeat precision farming goals.

It is possible for control systems to compensate for this delay, and one such system is set forth in Delay Coordinating System for a System of Operatively Coupled Agricultural Machine, set forth in U.S. patent application Ser. No. 09/165,251 filed on Oct. 1, 1998 by Alvin E. McQuinn, and Delay Coordinating System for Agricultural Machines, U.S. patent application Ser. No. 08/766,420, filed on Dec. 12, 1996 by Alvin E. McQuinn. Absent such a delay control system, decreasing the time from metering the crop input until applying it to a field can also serve to aid in precision farming. Thus, there is a need in the art for a crop input applicator which has little or no delay from the time the crop input is metered to when it is applied.

Other crop input applicator implements do not tow a storage tank, but carry crop inputs on the implement itself. The storage containers on these type of implements are necessarily limited in size and number. Because of the limited size, a farmer must stop and refill the storage containers each time a crop input is emptied. This becomes even more time consuming when multiple crop inputs are applied at different rates, which may cause the farmer to stop and refill different crop inputs at different times. Thus, there is a continuing need in the industry for a crop input applicator capable of applying multiple crop inputs which stay pre-charged thus not requiring a farmer to refill the crop input storage containers.

BRIEF SUMMARY OF THE INVENTION

The present invention is a pre-charged multi-variable rate crop input implement that carries several crop input reservoirs. These reservoirs are configured so that the reservoirs supply the crop inputs to be released at each row and are in close proximity to the dispensing point of the crop inputs. Because of this, the reservoirs are necessarily of limited capacity. The limited capacity of the reservoirs is not a problem, however, because the reservoirs are continually filled or charged with crop inputs from a remote source. Because the reservoirs are charged from a remote source, the farmer need not stop to make frequent refills often required by other implements.

The remote source can be either a towed crop input storage bin, or a variable payload vehicle. The remote source may charge the crop input reservoirs on the implement in a variety of ways. One way to move crop inputs from the remote source to the reservoirs is by using an air assisted system with fans, augers, or conveyor belts. Other configurations of conveyor belts, augers, pumps, or other crop input moving devices or combinations thereof are also possible.

Once the reservoirs are charged with crop inputs, the crop inputs are discharged via a dispensing point to the ground. The rate at which crop inputs are dispensed to the ground is controlled by a control system. The control system controls the rate of discharge through the dispensing points based on site specific data so that multiple crop inputs are applied at a precise prescriptive amount at a precise location. Furthermore, the control system also has sensors at each reservoir. These sensors serve to notify the control system as to the level of crop inputs at each reservoir. Thus, when the crop inputs are low in a particular reservoir, the sensor alerts the control system so the remote source can recharge the reservoir. The sensor again notifies the control system once the reservoirs have been properly charged, or filled, so that the flow of crop inputs is stopped and no overfilling occurs.

The reservoirs are located on the implement in close proximity to the dispensing points. Because the crop inputs are stored much closer to the dispensing points, there is only a negligible delay from when the control system calls for a desired crop input to when it is applied. Eliminating any delay makes the implement much more responsive to precision farming applications.

When discharged through the dispensing points, the multiple different crop inputs may all be discharged in one row. It is also possible for the different crop inputs to be discharged so that some crop inputs are slightly offset and are not placed directly in the same row. For instance, it may be desirable to place fertilizer beside a seed row, rather than in same row as the seed.

DETAILED DESCRIPTION

Figure 1:
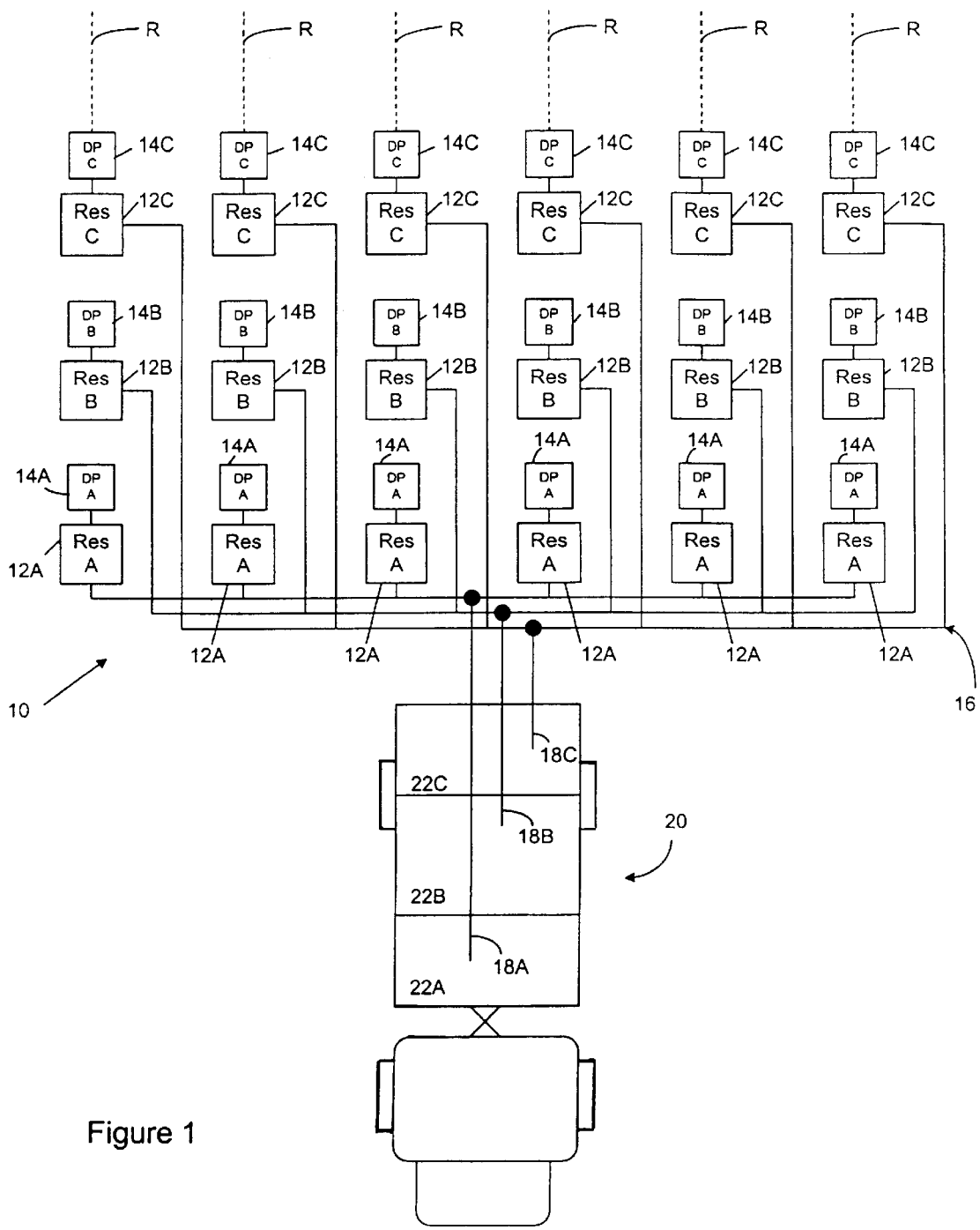
FIG. 1 is a diagrammatic representation of a pre-charged multi-variable rate product applicator machine with crop input reservoirs associated with each dispensing point.

FIG. 1 is a diagrammatic representation of a pre-charged multi-variable rate crop input applicator machine 10. Visible are first crop input reservoirs 12A, second crop input reservoirs 12B, and third crop input reservoirs 12C. Associated with each crop input reservoir 12A–12C is a crop input dispensing point 14A, 14B, and 14C, respectively. Also shown is a charging system 16, including charging lines 18A, 18B, and 18C, and a remote source 20. The remote source 20 carries bulk multiple crop inputs in storage bins 22A, 22B, and 22C. Each reservoir 12A–12C has associated one or more sensors and one or more actuators (not shown). While the embodiment of the invention shown in FIG. 1 has a three crop input capacity, the invention is not so limited and can be configured to apply more or less than three crop inputs at one time. Likewise, though the embodiment shown in FIG. 1 is a six row implement, the invention is not limited to that size.

The reservoirs 12A–12C are connected to the remote source 20 by the charging system 16. The charging system 16 delivers crop inputs from the remote source 20 to the crop input applicator 10. More specifically, charging system 16 includes charging lines 18A which deliver a first crop input A from the remote source 20 to the first crop input reservoirs 12A. The charging system 16 is also made up of charging lines 18B which deliver a second crop input B from remote source 20 to secondary crop inputs reservoirs 12B. Likewise, charging system 16 is made up of charging lines 18C which deliver a third crop input C from remote source 20 to third crop input reservoirs 12C.

The sensors associated with each reservoir 12A–12C notify the charging system 16 of when the level of crop inputs in each reservoir 12A–12C has been depleted to a certain level. The sensors likewise serve to notify the charging system 16 of when the crop inputs have been charged to a desired level so that the charging system 16 stops delivering crop inputs, thus avoiding overfilling the reservoirs 12A–12C. The sensors also provide feedback to notify the user of any malfunctions. The actuators associated with each reservoir 12A–12C let crop inputs into the reservoir, as well as dispense crop inputs from the reservoir. The actuators may be valves, electric motors, conveyor belts, nozzles, pumps, or other similar devices.

There are several options for remote source 20. For instance, the remote source 20 may be a variable payload vehicle capable of carrying multiple crop inputs in multiple storage containers, such as the vehicle shown in FIG. 1. Alternatively, the remote source 20 may be a towed crop input storage tank or tanks. The charging system 16 which delivers crop inputs from the remote source 20 to the implement 10 may be air assisted, or a system of augers, conveyor belts, pumps, or a combination thereof.

As can be seen in FIG. 1, the first crop input storage reservoir 12A, second crop input storage reservoir 12B, and third crop input storage reservoir 12C can all be configured so that crop inputs released from first crop input reservoirs 12A fall in the same row R as the crop inputs released from second crop input reservoirs 12B and third crop input reservoirs 12C. Sometimes it is desirable to avoid placing all crop inputs in a single row. For instance, to prevent fertilizer from "burning" a seed, it may be better to place the fertilizer beside a seed row, rather than in the same seed row as the seed. In such cases, the first crop input reservoirs 12A may be configured to release a crop input in row R, but rather than applying a secondary crop input in the same row, the secondary crop input reservoir 12B may be configured to place the secondary crop input slightly to the side of row R. Likewise, the third crop input reservoir 12C may be configured to release the third crop input slightly to the side of row R.

From the reservoirs 12A–12C, the crop inputs are discharged to the ground via dispensing points 14A–14C. The dispensing points 14A–14C are the points at which the crop inputs are released from the implement and are applied to the ground. As mentioned hereinbefore, each reservoir 12A–12C has associated with it actuators and sensors. The actuators control the charging of the reservoir 12A–12C from a remote source, and also control the dispensing of the crop inputs to the ground through the dispensing points 14A–14C. Thus, actuators at the reservoirs 12A–12C move crop inputs from the reservoir 12A–12C to the dispensing point 14A–14C. The dispensing points 14A–14C are conventional dispensing points well known to those skilled in the art, and may include but are not limited to knifes, shovels, injectors, wheels, or disks. Each dispensing point 14A–14C may also have actuators and sensors associated with it to provide feedback and control the application of crop inputs.

Figure 2:
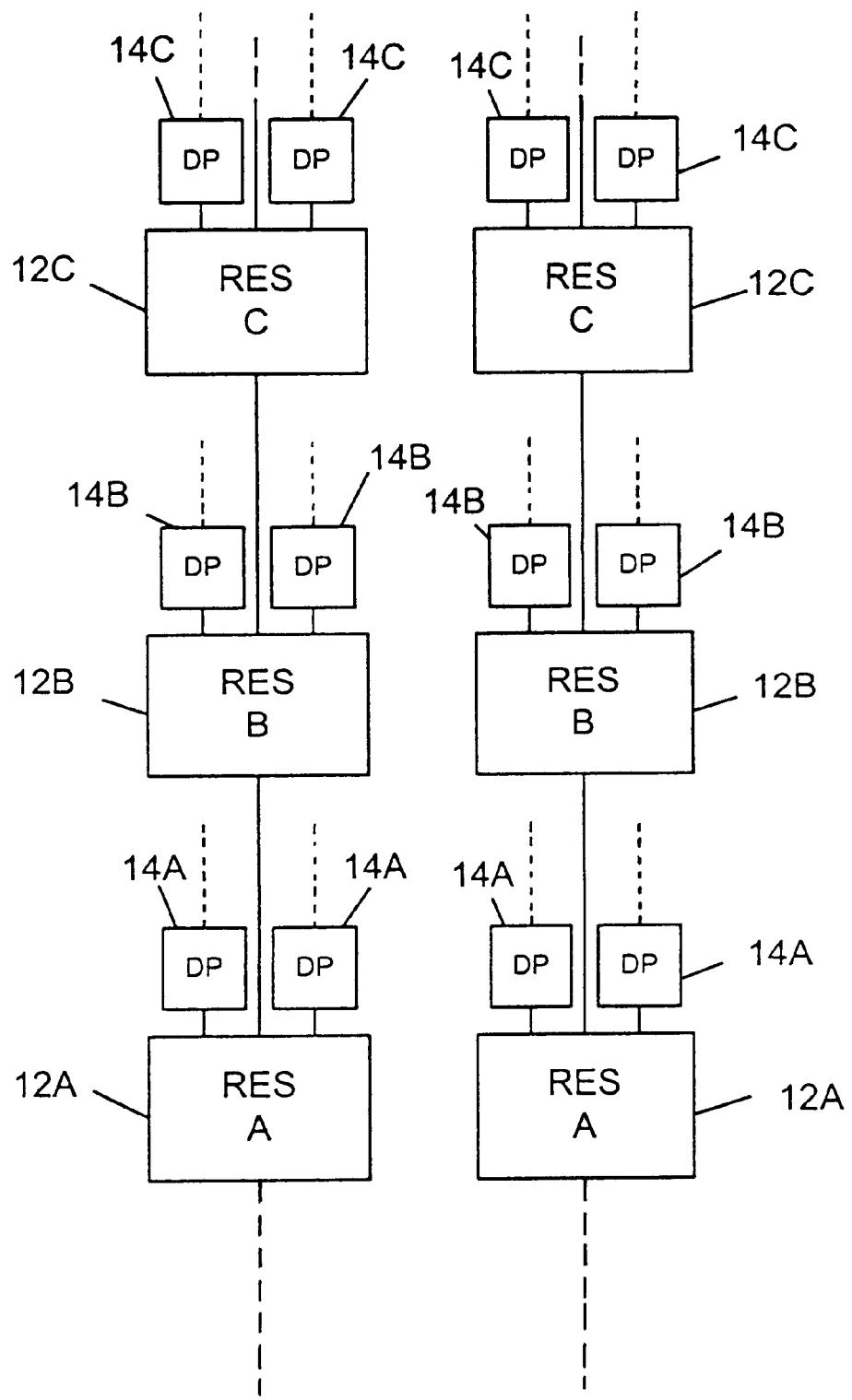
FIG. 2 is a diagrammatic representation of another embodiment of a portion of the pre-charged variable rate product applicator machine illustrating a reservoir serving more than one dispensing point.

While FIG. 1 shows one reservoir at each dispensing point, other configurations are possible. FIG. 2 shows a portion of an alternate embodiment, wherein a reservoir 12A–12C serves more than one dispensing point 14A–14C. The reservoirs 12A–12C illustrated in FIG. 2 can be configured with one bin which is subdivided into two or more compartments, each compartment holding a separate crop input. As illustrated in FIG. 2, a single reservoir 12A can serve two dispensing points 14A, a single reservoir 12B can serve two dispensing points 14B, and a single reservoir 12C can serve two dispensing points 14C. Similar configurations with a reservoir subdivided to hold several different types of crop inputs and capable of serving more than two dispensing points are also possible.

The reservoirs 12A–12C are located on the implement in close proximity to the point where the crop inputs are released to the ground. In precision farming, a locating system, such as a GPS system, is used in connection with a control system to apply crop inputs based on site specific data. Precision farming relies on applying crop inputs at the desired amount in the desired precise location. Because the crop inputs are stored in close proximity to the dispensing points, there is only a negligible delay from when the control system calls for a desired crop input to when it is applied to the field. Eliminating any delay makes the implement much more responsive to precision farming applications. The discharging system can likewise be air assisted, a system of conveyors, gears, augers, pumps, or a combination thereof. Crop input applicator devices with such discharging mechanisms are well known to those skilled in the art.

Figure 3:
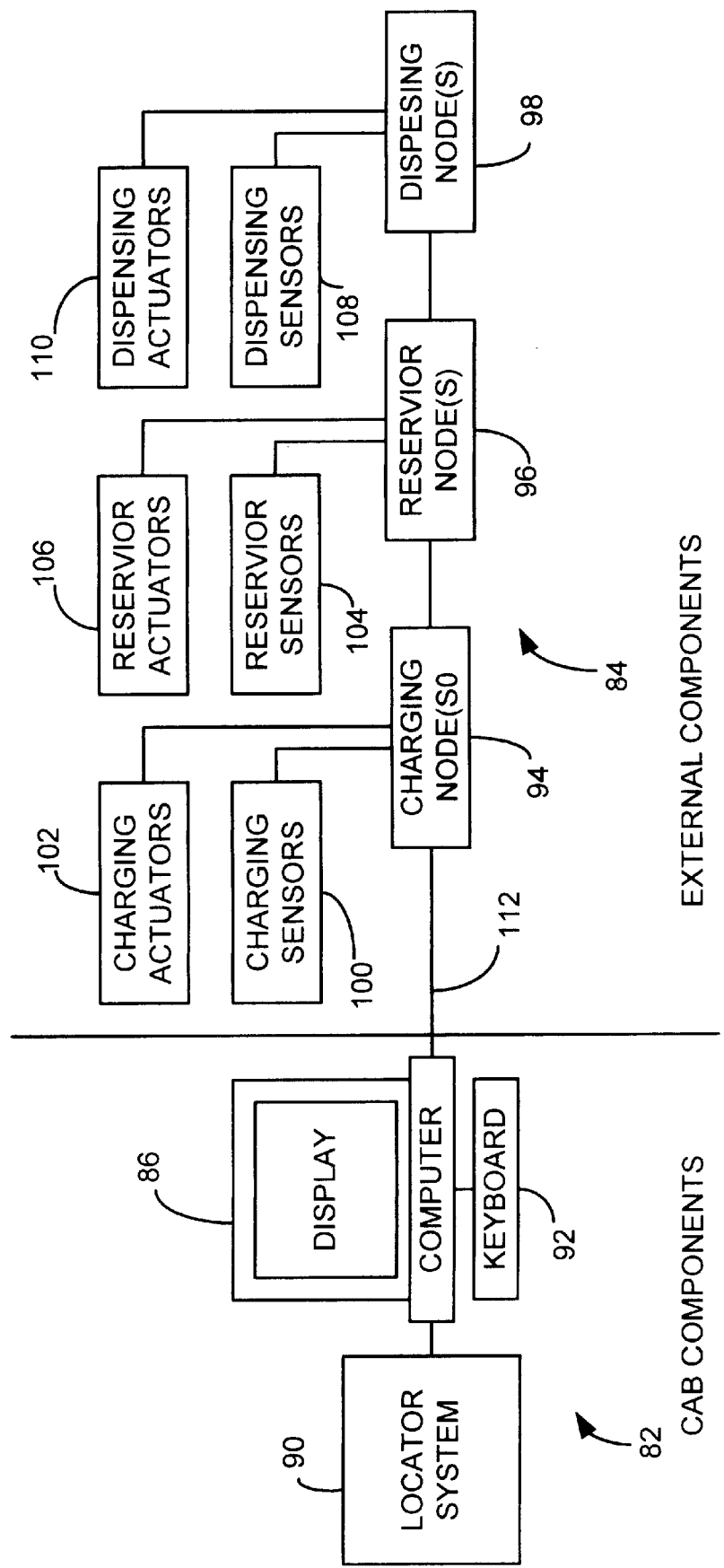
FIG. 3 is a simplified block diagram illustrating a pre-charged multi-variable rate product application machine control system which may be adapted for use with the present invention.

To operate in precision farming applications, the pre-charged multi-variable crop input applicator will typically have a control system to control the charging and discharging of crop inputs based on site specific data and locational data. The control system can thus apply a prescriptive mix of multiple crop inputs. The term prescriptive mix refers to applying multiple crop inputs such that the correct amount of each individual crop input is applied at the desired rate and location so that the total application of multiple crop inputs is achieved at the desired prescriptive amount. FIG. 3 illustrates a distributed control system, which is particularly useful in association with the present invention. Examples of distributed control systems are disclosed in U.S. Pat. No. 5,453,924 entitled Mobile Control System Responsive to Land Area Maps, by Monson, et al., and U.S. Pat. No. 5,757,640 entitled Product Application Control with Distributed Process Manager for Use on Vehicles, by Monson, both of which are assigned to Ag-Chem Equipment Co, Inc. of Minnetonka, Minn. Both the '924 patent and the '640 patent are incorporated by reference herein.

FIG. 3 is a simplified block diagram illustrating a precharged multi-variable rate product application machine distributed control system 80 which may be adapted for use with the present invention. The distributed control system 80 comprises cab components 82 and external components 84. The cab components 82 in this embodiment are an on-board computer 86 with a display device 88, a locator system 90 (which may be, for example, a GPS receiver), and a keyboard (or other input device) 92. The external components 84 are a charging node 94, a reservoir node 96, and a dispensing node 98. The charging node 94 has charging sensors 100 and charging actuators 102. Similarly, the reservoir node 96 has reservoir sensors 104 and reservoir actuators 106, and the dispensing node 98 has dispensing sensors 108 and dispensing actuators 110.

Connected to the computer 86 are the keyboard 92, display device 88, and a locator system 90. The on-board computer 86 receives location data from the locator system 90 and stores site specific data, usually in the form of one or more maps, on the on-board computer 86. The external components are connected to the on-board computer 86 via suitable wiring, cable, or other transmission medium 112. The on-board computer 86 is able to communicate location and site specific data to each node 94–98 through the wiring 112.

Each node 94–98 is capable of two way communication between the computer 86 and the node's 94–98 corresponding actuators 102, 106, and 110 and corresponding feedback sensors 100, 104, and 108. The nodes 94–98 control one or more actuators 102, 106, and 110, which may be valves, electric motors, conveyor belts, nozzles, pumps, or other similar devices, and the nodes 94–98 also receive feedback through one or more sensors 100, 104, and 108. There are as many charging nodes 94 as are necessary to control the charging of the implement with crop inputs from a remote source. It may be necessary to have a charging node 94 at each charging line, or at each crop input storage bin on the remote source, or at each reservoir on the implement. Likewise, there are as many reservoir nodes 96 as are necessary to control the level of crop inputs at each reservoir. It may be necessary to have a reservoir node 96 at each reservoir, or to have a reservoir node 96 for a group of reservoirs. Finally, there are as many dispensing nodes 98 as are necessary to control the dispensing of crop inputs at each dispensing point. This may require a dispensing node 98 at each dispensing point, or a dispensing node 98 for a group of dispensing points.

Each node 94–98 has a microprocessor which can be programmed to control the node's 94–98 corresponding actuators 102, 106, and 110 based on desired flow requirements and any feedback signals. The microprocessors may also allow the nodes 94–98 to receive data related to both the map data stored on the on-board computer 86 and the location data received from the locator system 90. In this manner, the computer 86 acts solely as a supervisor, with the nodes 94–98 acting in an autonomous fashion in controlling their corresponding actuators 102, 106, and 110. This gives rise to one of the benefits of a distributed control system 80; the only wiring required in the cab is the wiring 112. All the other wiring is external to the cab, occurring at the nodes 94–98. This greatly simplifies the wiring and makes trouble shooting and maintenance much easier.

More specifically, when used in connection with the present invention, the distributed control system 80 is capable of controlling the charging of reservoirs and discharging of crop inputs from the dispensing points such that crop inputs are applied at a variable prescriptive rate based on site specific data. To accomplish this, the charging node 94 is configured to control several charging actuators 102 which charge the reservoirs on the implement from the remote source. The actuators 102 may include augers, conveyor belts, pumps, motors, valves, solenoids, or other similar devices. Charging sensors 100 may also appear at node 94 to notify of any malfunction in the charging mechanisms.

Similarly, the distributed control system 80 controls the reservoirs through a reservoir node 96. The node 96 controls reservoir actuators 106, and more importantly receives feedback from reservoir sensors 104. Such feedback includes the level of crop inputs in the reservoir so that the node 96 is informed when the reservoirs are empty, as well as when the reservoir has been fully charged. A dispensing node 98 is configured to control several dispensing actuators 110 which discharge crop inputs from the reservoirs to dispensing points. The actuators 110 may include nozzles, augers, conveyor belts, pumps, motors, or other similar devices. Dispensing sensors 108 may serve to measure the flow of crop inputs through the dispensing points, such as with a seed counter or a flow meter, to permit the collection of as-applied data or performance data. Dispensing sensors 108 are also likely to appear at node 98 to notify of any malfunction in the discharging mechanisms.

The control system 80 is thus able to control the charging and discharging of crop inputs using the node 94–98 network. For instance, sensors 104 at the reservoir node 96 sense the level of crop inputs in a reservoir, and if the crop input level is low, the sensor 104 notifies the node 96. The node 96 in turn notifies the on-board computer 86, which then notifies the charging node 94. Actuators 102 at the charging node 94 activate crop input charging devices, such as pumps, augers, motors, or combinations thereof, to charge the reservoirs. Once full, sensors 104 at the reservoirs notify the reservoir node 96, which then communicates this status to the on-board computer 86, which can then notify the charging node 94. Once notified, the charging node 94 can stop actuators 102 so that the flow of crop inputs into the reservoirs is stopped. There are several mechanical or electro-mechanical options for such sensors 104 well known to those skilled in the art.

At the same time, the dispensing node 98 is moving crop inputs from the reservoirs to the dispensing points so that the crop inputs can be applied to the field. The dispensing node 98 controls actuators 110, such as motors, pumps, augers, or similar crop input devices. Sensors 108 provide feedback to the dispensing node 98 as to the flow rate of crop inputs. Because site specific data and location data are communicated from the on-board computer 86 to the dispensing node 98, the node 98 controls the actuators based on the feedback received from the sensors 108 and the site specific and location data so that crop inputs are applied at precise desired locations in the precise desired prescription. To aid in the precise application, sensors 108 at the dispensing node 98 may measure crop input flow rates as the crop inputs are applied. Sensors 108 may include flow meters or seed counters, or other similar devices.

Although the present invention has been described with reference to preferred embodiments, workers skilled in the art will recognize that changes may be made in form and detail without departing from the spirit and scope of the invention. For example, in some embodiments, a control system need not include a display or a keyboard. As used in this specification, "crop inputs" includes all different forms of crop products, such as seeds, fertilizers, chemicals, nutrients, herbicides, insecticides, or any other materials or components used in crop production.

What is claimed is:

1. A crop input implement system, the system comprising:
   a crop input implement having on it a plurality of crop input reservoirs;
   a remote source located off the crop input implement for storing bulk crop inputs;
   a charging system connecting the remote source to the crop input implement which fills the crop input reservoirs on the implement with crop inputs from the remote source;
   a plurality of dispensing points, wherein each dispensing point is associated with and is positioned proximate to a reservoir; and
   a control system configured to control a rate of discharge of crop inputs at each dispensing point so that the crop inputs are applied at a prescriptive rate.

2. The system of claim 1 wherein the plurality of dispensing points are located on the implement such that each crop input is released directly behind the other.

3. The system of claim 1 wherein the plurality of dispensing points are located on the implement such that each crop input is released at a position relative to the other.

4. The system of claim 1 wherein the control system is configured to control the application of multiple crop inputs as a function of a position in a field and site specific data which defines a prescriptive amount of desired multiple crop inputs for various positions in the field.

5. The system of claim 1 wherein the control system is configured to control the application of multiple crop inputs as a function of a position in a field and a prescription of desired multiple crop inputs for various positions in the field.

6. The system of claim 1 wherein the control system further comprises sensors capable of sensing a level of crop inputs in the reservoirs.

7. A system for applying crop inputs using a crop input implement, the system comprising:
   a crop input implement having a plurality of crop input reservoirs;
   a remote source located off the crop input implement and having a crop input storage container;
   a charging system for moving crop inputs from the remote source storage container to the plurality of crop input reservoirs on the crop input implement; and
   a dispensing system for dispensing crop inputs from a plurality of dispensing points on the implement, wherein each dispensing point is associated with and positioned proximate to a reservoir.

8. The system of claim 7 and further comprising a control system configured to control the application of crop inputs as a function of a position of the system in a field and site specific data which defines a prescriptive amount of desired multiple crop inputs for various positions in the field.

9. The system of claim 7 wherein the control system individually controls each dispensing point.

10. The system of claim 7 and further comprising a sensor at each reservoir to indicate a level of crop inputs held in the reservoir.

11. A method of applying crop inputs using a crop input implement, the method comprising:
    maintaining a level of crop inputs in a plurality of storage reservoirs located on the crop input implement by charging the reservoirs with crop inputs from a remote source located off the crop input implement; and
    applying crop inputs from a plurality of dispensing points at prescriptive rates based on position of the implement in a field, wherein each dispensing point is associated with and positioned proximate to a reservoir.

12. The method of claim 11 and further comprising sensing a level of crop inputs in the storage reservoirs.

* * * * *